United States Patent [19]

Kidwell et al.

[11] Patent Number: 4,648,890
[45] Date of Patent: Mar. 10, 1987

[54] COMBINATION DOWNFLOW-UPFLOW VAPOR-LIQUID SEPARATOR

[75] Inventors: John H. Kidwell, Uniontown; William P. Prueter; Andrew M. Eaton, both of Alliance, all of Ohio

[73] Assignee: The Babcock & Wilcox Company, New Orleans, La.

[21] Appl. No.: 706,380

[22] Filed: Feb. 27, 1985

[51] Int. Cl.[4] .................................................. B01D 45/12
[52] U.S. Cl. ........................................ 55/347; 55/396; 55/448
[58] Field of Search ................ 55/199, 202, 347, 348, 55/396, 398, 447, 448

[56] References Cited

U.S. PATENT DOCUMENTS

| | | | |
|---|---|---|---|
| 2,594,490 | 4/1952 | Patterson | 55/347 X |
| 3,216,182 | 11/1965 | Cochran et al. | 55/398 X |
| 3,324,634 | 6/1967 | Brahler et al. | 55/347 X |
| 3,498,028 | 3/1970 | Trouw | 55/396 X |
| 3,603,062 | 9/1971 | Robbins et al. | 55/348 |
| 3,605,388 | 9/1971 | Zuiderweg et al. | 55/396 X |
| 3,788,282 | 1/1974 | Modrak et al. | 55/347 X |
| 4,289,514 | 9/1981 | Carter et al. | 55/347 X |
| 4,318,368 | 3/1982 | Carson et al. | 55/348 X |
| 4,322,233 | 3/1982 | Sisk | 55/448 X |
| 4,349,360 | 9/1982 | Schuurmans et al. | 55/347 X |

FOREIGN PATENT DOCUMENTS 2126499  3/1984  United Kingdom ................ 55/348

*Primary Examiner*—Robert Spitzer
*Attorney, Agent, or Firm*—Robert J. Edwards

[57] ABSTRACT

An improved vapor-liquid separator having a vertically disposed conduit for flow of a mixture. A first, second and third plurality of curved arms penetrate and extend within the conduit. A cylindrical member is radially spaced from the conduit forming an annulus therewith and having perforations and a retaining lip at its upper end.

2 Claims, 11 Drawing Figures

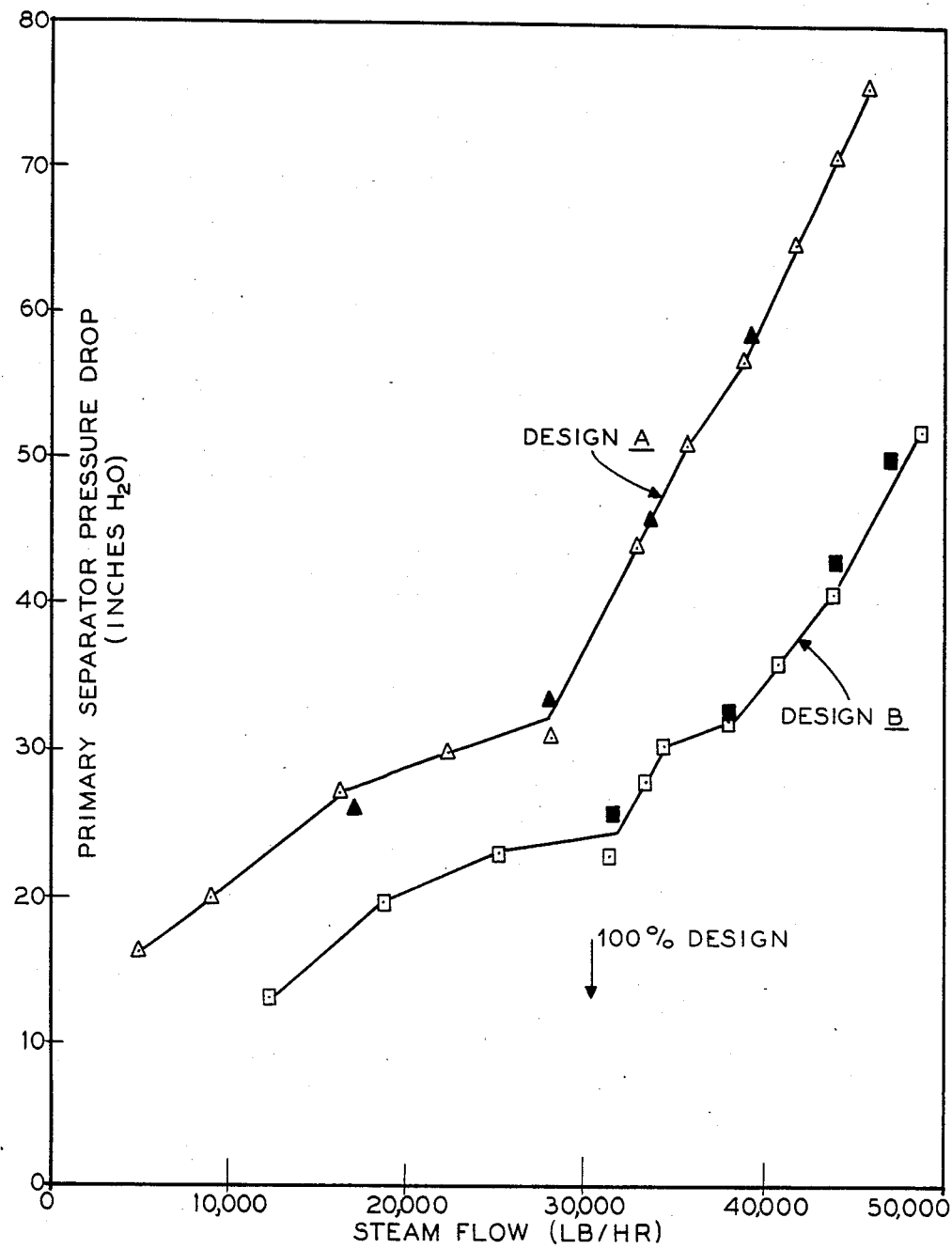

COMBINATION DOWNFLOW-UPFLOW VAPOR-LIQUID SEPARATOR

The Government has rights in this invention pursuant to BAFL Contract No. 73-R-N 610311-S awarded by the Department of Energy.

BACKGROUND OF THE INVENTION

Field of the Invention

This invention covers an improved design of vapor-liquid separators of the type generally installed in natural circulation, vertically oriented, nuclear steam generators. More specifically, the improved vapor-liquid separators are vertically disposed in an upper portion of a pressure vessel and with a bottom inlet for upward vertical flow of a vapor-liquid mixture, separation of the phases being effected by centrifugal forces.

The number of separators, which may exceed one hundred, which can be installed in a steam generator is limited by the diameter of the pressure vessel. These pressure vessels are an expensive item of equipment, their cost being a direct function of diameter. Consequently, for economic consideration, the size of steam generators are kept at a minimum, commensurate with steam generating requirements which then limits the number and total capacity of separators of existing designs operating within their design limits.

SUMMARY OF THE INVENTION

The present invention is an improved design of a primary vapor-liquid separator vertically disposed in a pressure vessel and having a bottom, axial admission of a two-phase mixture into a conduit or riser of varying internal diameter. The upper portion of the riser is penetrated by a first plurality of curved arms radially disposed around the riser and which extend into the riser and receive the mixture flowing therethrough. A second and third plurality of curved arms are located immediately below the first plurality of curved arms and are mutually contiguous. The arms discharge the mixture flowing therein into an annulus formed by a cylindrical member concentric to and radially spaced from the riser. A portion of the cylindrical member which extends above the top of the curved arms comprises a multiplicity of perforations and a retaining lip which extends inwardly from the top of the cylindrical member. Separated vapor leaves the upper open end of the cylinder and separated liquid leaves the cylinder through the perforations and at the bottom of the cylinder.

BRIEF DESCRIPTION OF DRAWINGS

FIG. 11 is a plot of vapor-liquid separator pressure drop for the invention vs. the prior art.

DETAILED DESCRIPTION

Figure 1:
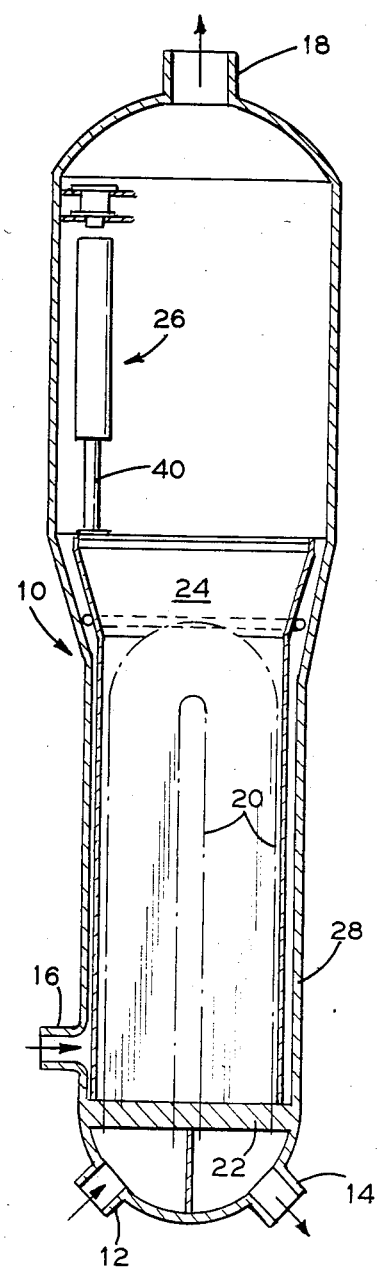
FIG. 1 is a schematic representation of a steam generator utilizing the invention.
Figure 3:
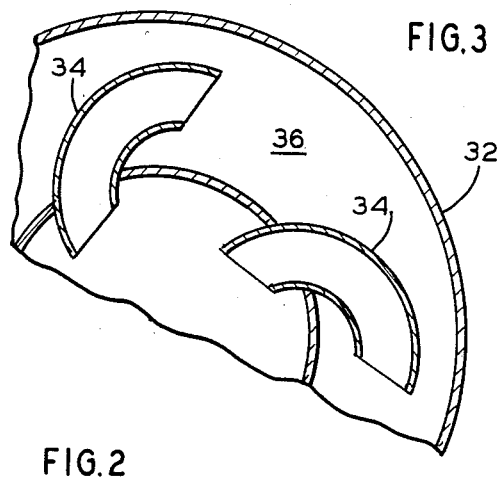
FIG. 3 is a partial plan section taken along the lines 3—3 of FIG. 2.
Figure 2:
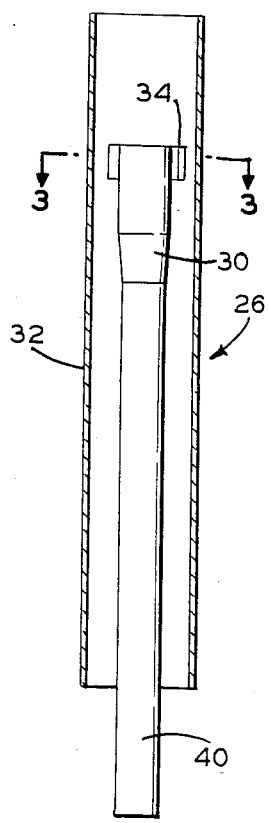
FIG. 2 shows a prior art vapor-liquid separator in front elevation.
Figure 4:
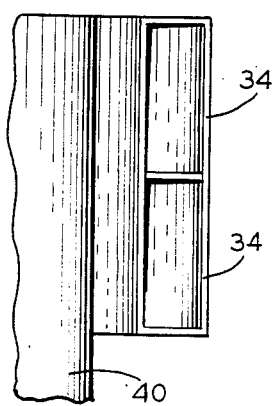
FIG. 4 is a partial enlarged view in front elevation of a curved arm connection to a riser as found with the prior art separator of FIG. 2.
Figure 6:
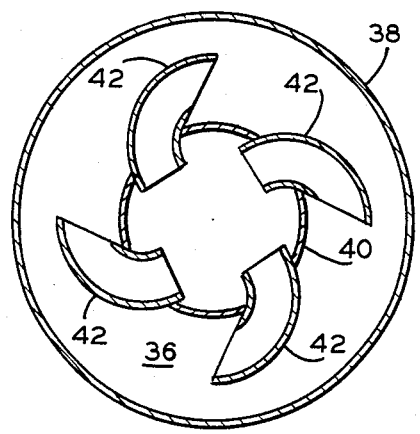
FIG. 6 is a plan section taken along the lines 6—6 of FIG. 5.
Figure 5:
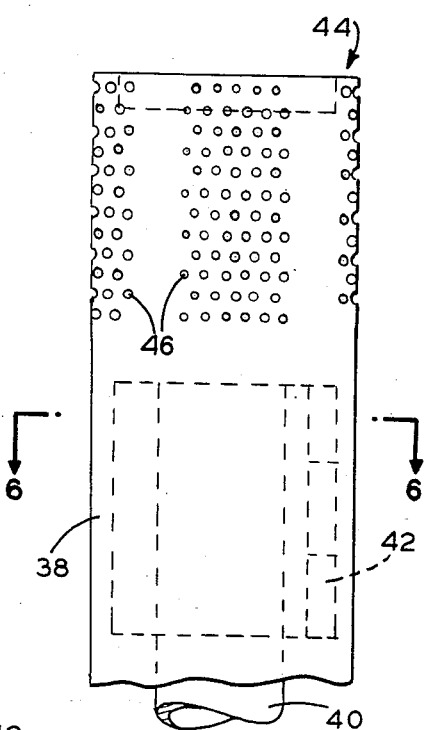
FIG. 5 shows a front elevation of a vapor-liquid separator in accordance with the invention.
Figure 7:
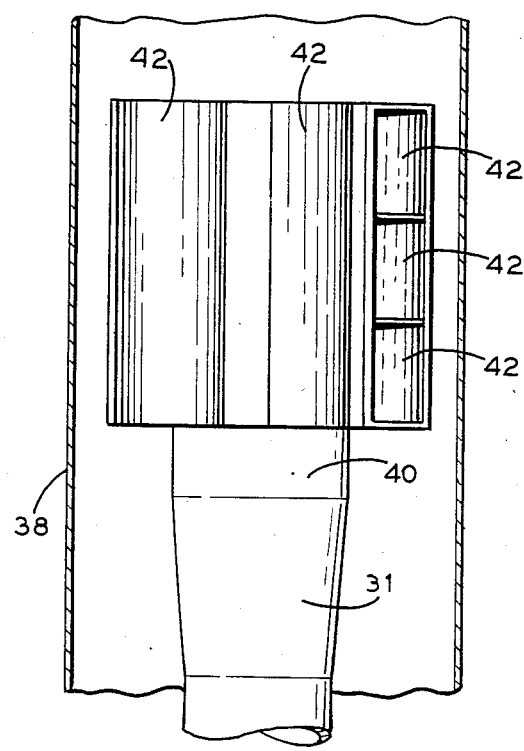
FIG. 7 shows a partial enlarged view in front elevation of a contiguous group of curved arms connected to a riser in accordance with the invention.
Figure 8:
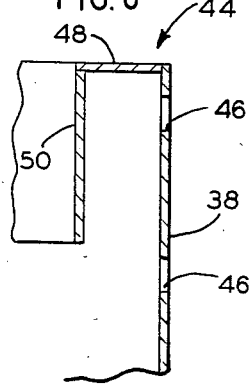
FIG. 8 is a partial enlarged view in front elevation of the retaining lip of FIG. 5.

Referring to FIG. 1, there is shown a steam generator 10 comprising a pressure vessel 28. A hot fluid enters the vessel 28 through inlet nozzle 12, flows upward then downward in tubes 20, secured in the tube sheet 22 and exits the vessel 28 through outlet nozzle 14. A cold fluid enters vessel 28 through nozzle 16, passes over and around the tubes 20 in heat transfer relationship and enters plenum 24 as a two-phase mixture of vapor and liquid. A plurality of primary vapor-liquid separators 26 are mounted in the upper portion of vessel 28 and in flow communication with plenum 24 through risers 40. The vapor-liquid mixture is separated in separators 26, the vapor exiting vessel 28 through outlet nozzle 18 and the liquid returning to the lower portion of the vessel 28 for recirculation with incoming cold fluid.

Referring to FIGS. 1, 2, 3 and 4, there is shown a vapor-liquid separator 26 representative of the prior art and designated as Design A. This design is covered by U.S. Pat. No. 4,289,514, issued to H. R. Carter et al, and assigned to the assignee of the present invention.

A vapor-liquid mixture enters riser 40 from plenum 24, and traverses vertically upward in riser 40 which is closed at its upper end. The lower section of riser 40 has a diameter less than that of the upper section and to which the lower section is connected by a frusto-conical transition section 30. The vapor-liquid mixture exits riser 40 through a first and second plurality of curved arms 34 located in the upper portion of riser 40. The arms 34 extend into riser 40 and terminate in the annulus 36 formed between riser 40 and return cylinder 32.

Referring to FIGS. 5, 6, 7 and 8 there is shown a vapor-liquid separator in accordance with the invention. The separator is applicable to steam generators illustrated in FIG. 1 and is designated Design B.

A vapor-liquid mixture enters riser 40 from plenum 24, and traverses vertically upward in riser 40 which is closed at its upper end. The lower section of riser 40 has a diameter less than that of the upper section and to which the lower section is connected by a frusto-conical transition section 31. The vapor-liquid mixture exits riser 40 through a first plurality of curved arms 42 located in the upper portion of riser 40. Curved arms 42 are similar in shape to a truncated torus, having a rectangular cross-section, the ends of which are coplanar. The arms 42 extend into riser 40 and terminate in the annulus 36, formed between the riser 40 and return cylinder 38. A second and third plurality of curved arms 42 are located immediately below the first plurality of curved arms and are mutually contiguous. The design of the curved arms and riser is generally similar to that covered by U.S. Pat. No. 4,289,514. The improved separator has a total of 12 arms, stacked three high, extending from the central riser 40. Each arm is $1\frac{5}{8}$ inches wide and the total height of three arms is $13\frac{1}{4}$ inches. The riser 40 and the arms 42 are concentrically located in a 13½ inch diameter return cylinder 38 which extends above the top of the arms 42. The portion of the return cylinder above the arms is comprised of perforations 46 and a retaining lip 44. In the embodiment illustrated, there are four arrays of sixty six ½ inch diameter holes each around the return cylinder. The arrays are in 45 degree segments to suit an arrangement of separators in a square pitch which prohibited having perforations around the complete circumference of the return cylinder. This array pattern permits water to be discharged only in the void areas around the separators. It is understood that different geometrical pattern arrangements of separators would have different arrays to suit. The retaining lip 44 comprises a horizontal annular plate 48, one end of which is secured to and extends inwardly from return cylinder 38. The other end of annular plate 48 has a vertically extending annular plate 50.

The unique features of this separator enable operation over a wide range of flow conditions thus categorizing the separator as a downflow-upflow separator. The steam and water mixture is introduced into the annulus 36 such that a swirling motion is imparted to the mixture. The mixture swirls on the inside of return cylinder 38 with most of the remaining steam being separated, initial partial separation having been effected in the curved arms 42. The separated steam flows upward through the core of the swirling mixture and exits at the top of return cylinder 38. The swirling water flows in a downward direction and leaves the separator at the bottom of return cylinder 38 to mix with incoming feedwater in pressure vessel 28. This characteristic, which applies to lower flows, is analogous to counter-current annular two-phase flow or a "downflow" separator.

For higher flows, the operational characteristic changes from pure counter-current to combined counter-current and co-current. The co-current flow is analogous to the operation of an "upflow" separator. In this mode of operation, a significant portion of the separated mixture flows upward with a steam core in the center. The retaining lip 44 restricts the growth of the liquid annulus and the separated liquid exits radially through perforations 46. These features play an important role in satisfactory separator performance. The retaining lip 44 and perforations 46 eliminate water spillage over the top of the return cylinder with consequent low moisture entrainment in the steam within the design flow limits of the separator.

To maintain high circulation ratios in recirculating steam generators, it is necessary to minimize the primary separator pressure drop. The triple stacked contiguous re-entrant arms reduce separator pressure drop without sacrificing free drum area which comprises the cross-sectional return cylinder area minus the cross-sectional area of arms and riser as seen at annulus 36. Adequate free drum area must be maintained to allow steam to escape from the separator without moisture entrainment or carryover.

Figure 9:
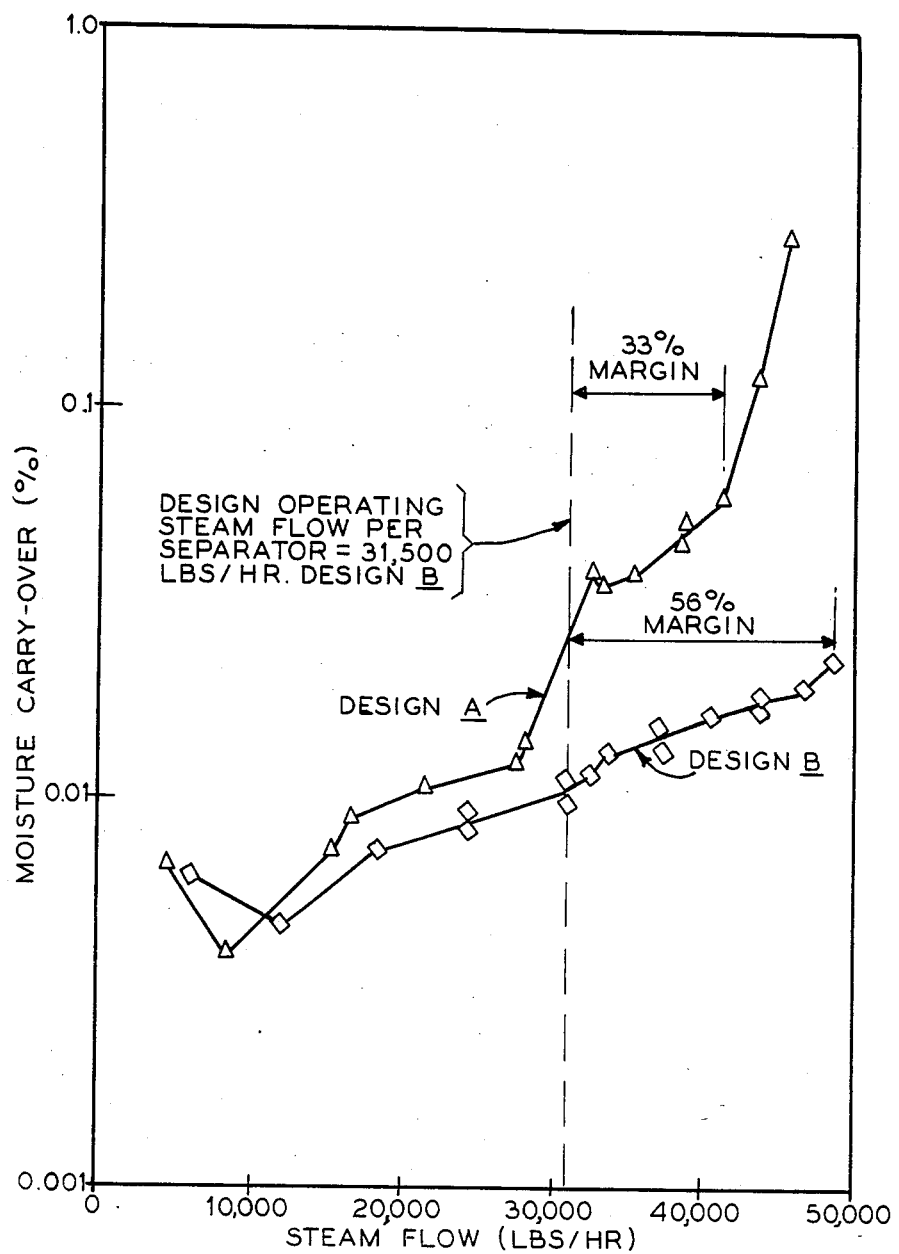
FIG. 9 is a plot of test results of moisture carryover for the invention vs. the prior art.

Referring to FIG. 9 there is shown a plot of test results of moisture carryover in percent by weight versus steam flow for the Design A and Design B separators and illustrates the greater capacity of the Design B separator. Separator capacity can be defined by the breakaway point or the condition where a small change in steam flow results in excessive moisture carryover. This point is 42,000 lbs/hr for the Design A separator. For the Design B separator, breakaway was not reached because of a test facility limitation of 49,000 lbs/hr, however the latter steam flow condition represents at least a 16 percent increase in capacity compared to the Design A separator.

Figure 10:
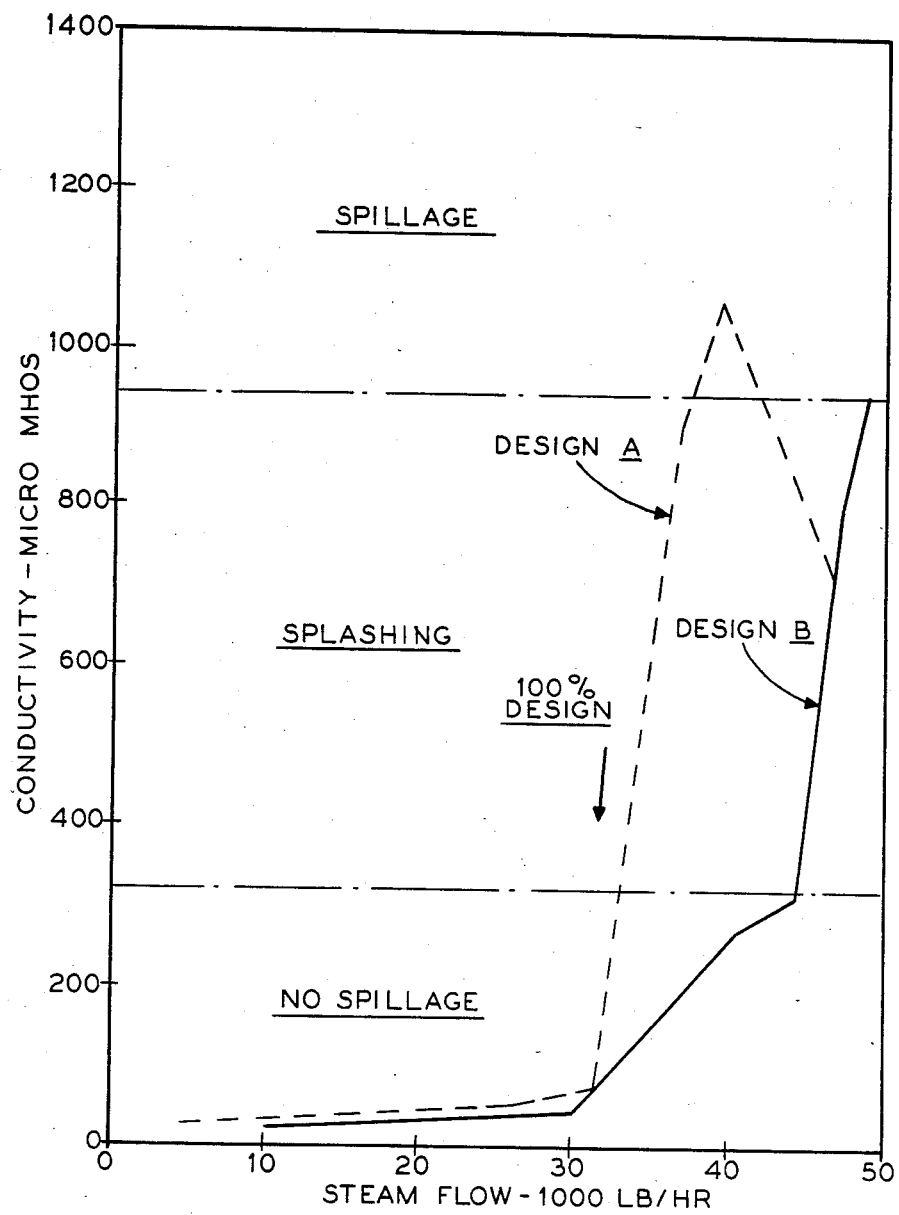
FIG. 10 is a plot of test results of water spillage for the invention vs. the prior art.

FIG. 10 illustrates water spillage over the return cylinder characteristics as indicated by conductivity measurements for the Design A and Design B separators. Indication of water spillage occurred at approximately 39000 lbs./hr. steam flow for the Design A separator. The instrument line used to extract the fluid sample for the Design A separator was located on the outside of the return cylinder, 15 inches above the top of the curved arms. For the Design B separator, the instrument line used to extract the sample was located on the inside of the return cylinder, 15 inches above the curved arms. This measurement did not indicate any water in that region up to 49000 lbs./hr. steam flow. It is thought that any water in that region was removed through the perforations below the point of measurement and did not spill over the return cylinder.

As previously stated, to maintain high circulation ratios in natural circulation steam generators, it is necessary to minimize the primary separator pressure drop. FIG. 11 is a plot of pressure drop versus steam flow for the Design A and Design B separators. At the design steam flow of 31500 lbs/hr. per separator for the Design B separator, the primary separator pressure drop was approximately 60 percent lower than the Design A separator.

From the foregoing, it is apparent that this new and improved primary separator design provides increased steam capacity, elimination of water spillage over the top of the return cylinder, and reduction of moisture carryover and pressure losses, and represents an advance in the state-of-the-art.

The foregoing description has been directed to a particular preferred embodiment of the present invention for purposes of explanation and illustration. It should be recognized, however, by those skilled in the art that modifications and changes in the invention may be made without departing from the scope and spirit of the invention. It is therefore intended that the following claims cover all equivalent modifications and variations as fall within the scope of the invention as defined by the claims.

The embodiments of the invention in which an exclusive property or privilege is claimed are defined as follows:

1. A vapor-liquid separator device comprising: a vertically disposed riser serving as a conduit for vertical flow of a two-phase mixture, open at its lower end to admit the mixture and closed at its upper end, the riser being formed of upper and lower sections interconnected by a frusto-conical section, the lower section having a diameter less than that of the upper section, a first plurality of curved arms radially disposed around the riser at its upper portion and extending into the riser to receive the mixture flowing therethrough, a second and third plurality of curved arms located immediately below the first plurality, the arms being mutually contiguous, a cylindrical member concentric to and outwardly radially spaced from the riser, forming an annulus therewith to receive the mixture from the curved arms, the upper portion of the cylindrical member extending above the curved arms and having a multiplicity of perforations for radial discharge of a portion of the separated liquid, means for discharge of the separated liquid at its lower end, means for discharge of the separated vapor at its upper end, and a retaining lip, one end of which is attached to the top of the cylindrical member and extending radially inward, the other end of which has a vertically extending annular plate.

2. The vapor-liquid separator of claim 1 in which the curved arms are rectangular in cross-section and the ends of which are co-planar.

* * * * *